Nov. 12, 1935.  B. E. LENEHAN  2,020,952
BACKFIRING INDICATOR FOR MERCURY ARC RECTIFIERS
Filed May 11, 1933

WITNESSES:
E. A. McCloskey
S. A. Strickett

INVENTOR
Bernard E. Lenehan.
BY O. B. Buchanan
ATTORNEY

Patented Nov. 12, 1935

2,020,952

UNITED STATES PATENT OFFICE 2,020,952

BACKFIRING INDICATOR FOR MERCURY ARC RECTIFIERS

Bernard E. Lenehan, Bloomfield, N. J., assignor to Westinghouse Electric & Manufacturing Company, East Pittsburgh, Pa., a corporation of Pennsylvania Application May 11, 1933, Serial No. 670,480

8 Claims. (Cl. 175—294)

My invention relates to a backfire relay and particularly to a relay for controlling a mercury-arc rectifier upon the occurrence of an inverse current or backfire in the rectifier.

In the operation of mercury-arc rectifiers serious obstacles have developed because of the occurrence of backfires or reverse current arcs in the rectifying devices.

It is an object of my invention to provide a relay sensitive to such inverse currents for controlling the operation of the rectifier.

It is a further object of my invention to provide a back current relay capable of automatically resetting after each operation.

Other objects and advantages of my invention will be apparent from the following detailed description taken in conjunction with the accompanying drawing, in which.

Figure 1:
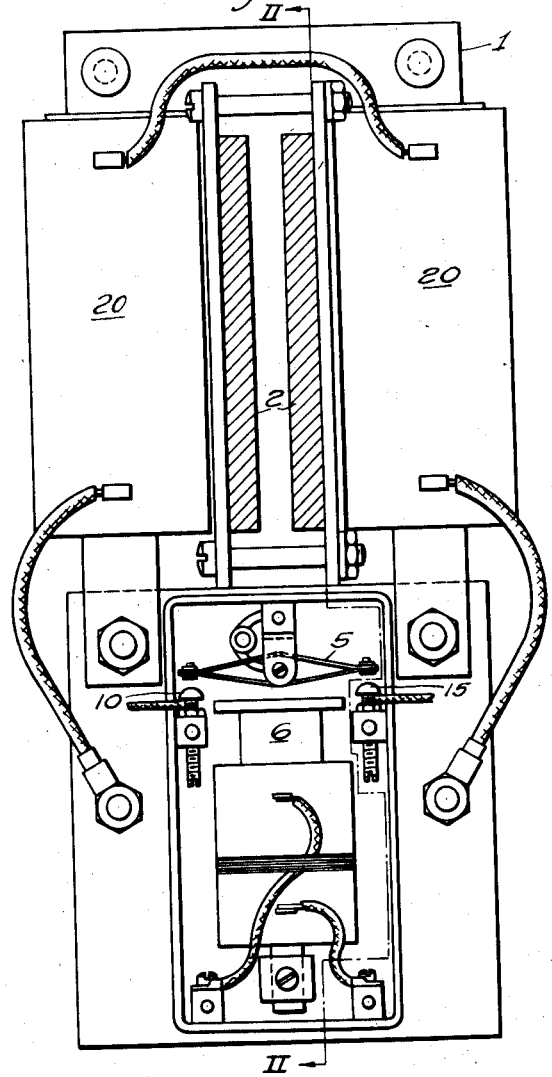
Figure 1 is an elevation of a relay according to my invention.
Figure 2:
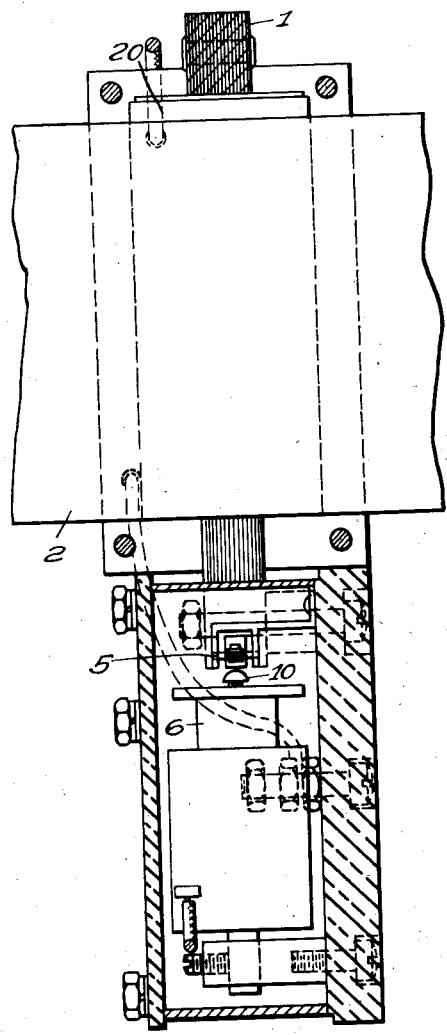
Fig. 2 is a sectional elevation taken along the line II—II of Fig. 1.
Figure 3:
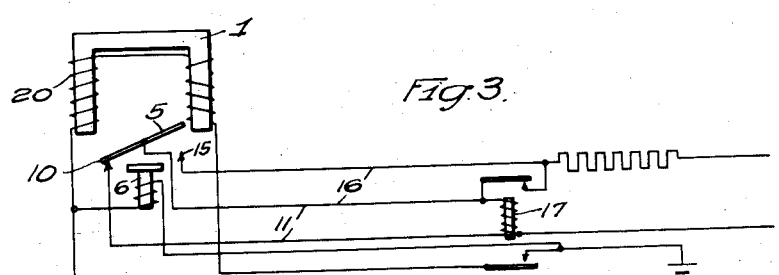
Fig. 3 is a schematic diagram of a relay according to my invention.

The apparatus according to my invention comprises a yoke 1 of magnetic material, such as laminated iron, adapted to be securely clamped about a uni-directional current-carrying bus 2 attached to the rectifier. A pivoted switch arm 5 of a material suitable for permanent magnets is placed adjacent the open end of the yoke 1 so that the switch arm 5 will have a polarity induced by the polarity of the yoke which is in turn determined by the magnetic flux set up by the current flowing in the uni-directional bus 2.

Regardless of the fluctuation of the current in the bus 2 the magnetic flux about the bus will always establish the same polarity in the magnetic yoke 1. However, if the current in the bus 2 should reverse even momentarily the magnetic polarity of the yoke 1 would be reversed, which in turn would reverse the polarity of the pivoted switch arm 5. As the switch arm is capable of becoming a permanent magnet it retains its reverse polarity even though the reverse current is of very short duration.

An auxiliary magnet 6 is placed adjacent the open end of the yoke 1 so that the position of the switch arm 5 will be determined by its polarity and the polarity of the auxiliary magnet 6. I prefer to make the auxiliary magnet 6 an electromagnet so that the polarity will be constant and not subject to change by reversal of current in the uni-directional bus 2.

When the current flows in the bus 2 the yoke 1 is polarized and in conjunction with the auxiliary magnet 6 the switch arm 5 takes up a position in contact with a suitable contact 10. If the current in the bus is in the desired direction, the switch arm will close a circuit 11, deenergizing the relay. However, if the current should be in the inverse direction, the switch arm 5 would close a suitable contact 15 to actuate a relay circuit 16. Preferably the relay circuit 16 is provided with a lock-in device 17 which will hold the relay circuit in operative position until the polarity of the yoke 1 is again re-established.

Since the relay circuit may be used to disconnect or deenergize the rectifier, I provide a suitable resetting coil 20 on the magnetic yoke 1. A suitable relay which may be the lock-in relay 17, is used to apply direct current of a suitable polarity to the resetting coil 20. When the polarity of the yoke has been re-established, the switch arm 5 will return to its normal position, deenergizing the relay circuit and upon deenergizing the relay circuit 16, the lock-in device 17 will be opened and the resetting coil 20 deenergized.

While I have shown and described a specific embodiment of my invention, it is apparent that changes and modifications can be made therein without departing from the spirit and scope of my invention. I desire, therefore, that only such limitations shall be imposed as are necessitated by the prior art or as may be embodied in the accompanying claims.

I claim as my invention:

1. A reverse current relay for a current rectifying device comprising a yoke of magnetic material, said yoke having its polarity determined by the current in said device, a movable switch arm associated with said yoke, an auxiliary magnet adjacent said yoke, said auxiliary magnet and said yoke determining the position of said switch arm, a control circuit operated by said switch, a relay in said circuit energized when said switch is in one position and deenergized when said switch is in another position, a coil associated with said yoke for imparting a predetermined polarity to said yoke and a supply circuit controlled by said relay.

2. A control device for a vapor-electric device comprising a conductor normally carrying uni-directional current, a magnetic member energized by the magnetic field about the conductor, an auxiliary magnetic element of fixed polarity, and a magnetic switch element influenced by both of said magnetic elements, a control circuit energized by said switch, a relay in the control circuit and means operated by said relay for predetermining the polarity of the first-mentioned magnetic element.

3. A backfire relay for vapor-electric devices comprising a uni-directional current conductor connected to said device, a laminated soft iron yoke about said conductor, a movable armature of permanently magnetizable material associated with said yoke, a biasing magnet adjacent to said armature, a plurality of contacts carried by said armature, said yoke and said biasing magnet operating to move said armature to close one set of contacts for normal current flow in said conductor and moves the armature to close another set of contacts upon reverse current flow in said conductor, a control circuit energized by said contactor, said armature maintaining said control circuit inoperative for normal current flow in the conductor.

4. A backfire control for a rectifying device comprising a uni-directional current carrying lead attached to said device, a yoke of magnetic material secured about said lead, a contact arm of permanently magnetizable material adjacent the open end of the yoke, a biasing pole adjacent said arm said biasing pole and said yoke operating to move the arm to close one set of contacts when current flows in normal direction in said lead and to close another set of contacts when current flows in reverse direction.

5. A backfire control for a rectifying device comprising a uni-directional current carrying lead attached to said device, a yoke of magnetic material secured about said lead, a contact arm of permanently magnetizable material adjacent the open end of the yoke, a biasing pole adjacent said arm, said biasing pole and said yoke operating to move the arm to close one set of contacts when current flows in normal direction in said lead and to close another set of contacts when current flows in the reverse direction, and means for returning said arm to reclose the first-mentioned contacts after termination of the reverse current flow.

6. A control device for a mercury-arc rectifier comprising a conductor normally carrying current in only one direction, a magnetic element having its instantaneous polarity determined by the magnetic field about the conductor, an auxiliary magnetic element of fixed polarity, a permanently magnetizable armature the polarity of which is determined by the direction of current flow in said conductor, a plurality of contactors operable by said armature and a control circuit operated through said contactors, a coil associated with said first-mentioned magnetic element for establishing a predetermined polarity in said armature and means in said control circuit for controlling said coil.

7. A control device responsive to inverse current in a vapor-electric device comprising a uni-directional current conductor connected to said device and carrying the load current thereof, a laminated soft iron yoke about said conductor and energized by the field about said conductor, a movable armature of permanently magnetizable material associated with said yoke, a plurality of contacts carried by said armature, a biasing magnet adjacent said armature, said yoke operating on normal direction of current flow in said conductor to induce a polarity in said armature which in cooperation with said biasing magnet moves said armature to close one set of contacts, and on the occurrence of reverse current in said conductor reverses the polarity of said armature which then moves to close another set of contacts.

8. A control device for an electric current rectifier comprising a bus carrying the output current of the rectifier, a magnetizable U-shaped member clamped around said bus, said member being energized by the magnetic field about said bus, an arm of magnetizable material suitable for permanent magnets pivoted adjacent the open end of said member, a winding associated with said member, a source of current adapted to be connected to said winding for imparting a predetermined polarity to said arm, said member acting on reversal of current in said bus to reverse the polarity of said arm and actuate the control device.

BERNARD E. LENEHAN.